United States Patent [19]

Michling

[11] 3,854,349

[45] Dec. 17, 1974

[54] MULTI-STAGE SPEED REDUCER WITH RESILIENT SHAFT SUPPORTS

[75] Inventor: Wilhelm Michling, Hattingen, Germany

[73] Assignee: Lohmann & Stolterfoht Aktiengesellschaft, Witten/Ruhr, Germany

[22] Filed: Dec. 11, 1972

[21] Appl. No.: 314,216

[30] Foreign Application Priority Data
Dec. 16, 1971 Germany............................ 7147881
Dec. 23, 1971 Germany............................ 2165286

[52] U.S. Cl........................... 74/801, 74/411, 74/740
[51] Int. Cl.............................................. F16n 1/46
[58] Field of Search...................... 74/801, 411, 740

[56] References Cited
UNITED STATES PATENTS

| | | |
|---|---|---|
| 1,928,763 | 10/1933 | Rosenberg............................ 74/801 |
| 2,460,629 | 2/1949 | Fawick.................................. 74/801 |
| 2,473,267 | 6/1949 | Wightman................... 308/184 R X |
| 2,487,653 | 11/1949 | Heintze............................ 74/801 X |
| 2,583,140 | 1/1952 | Else ....................................... 74/801 |
| 2,759,376 | 8/1956 | Chamberlin et al. .................. 74/801 |
| 3,218,889 | 11/1965 | Jarchow................................. 74/801 |
| 3,277,747 | 10/1966 | Froehlich et al...................... 74/801 |
| 3,292,457 | 12/1966 | Horowitz .......................... 74/411 X |

Primary Examiner—Samuel Scott
Assistant Examiner—J. Reep
Attorney, Agent, or Firm—Ralf H. Siegemund

[57] ABSTRACT

A multi-stage speed reducer drive comprising a reduction stage coupled to a first and second planetary gearing stage. The power take-off end of the second planetary gearing stage at the output end of the system yieldingly resiliently journals the center gear of that stage. The first planetary gearing as an intermediate stage, has also a web gear which is secured to the center gear of the output stage and is additionally mounted for pendulum movement. A simple speed reducing gear drives the center gear of the intermediate stage.

6 Claims, 3 Drawing Figures

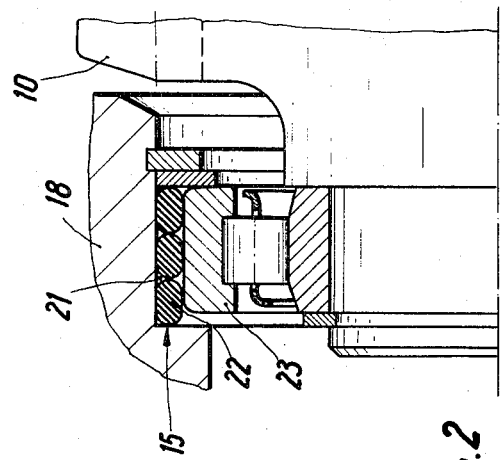
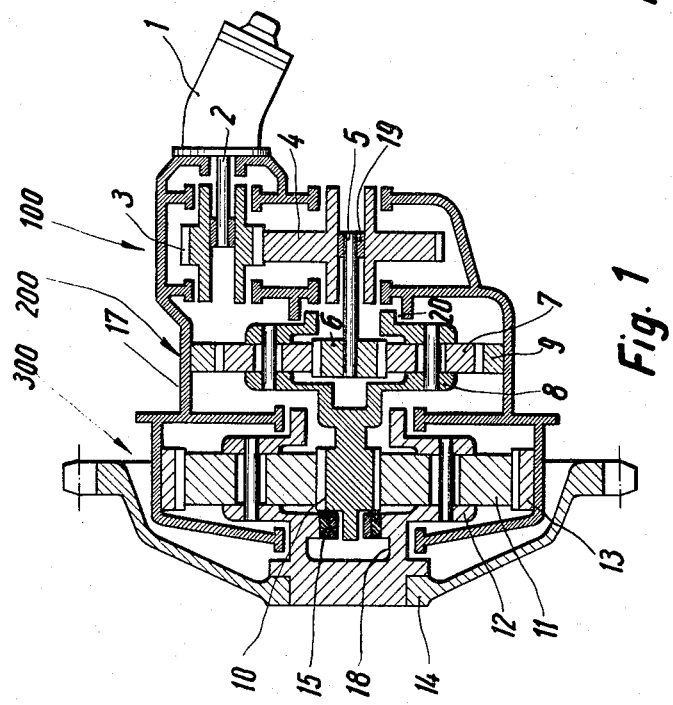
Fig. 2
Fig. 1

MULTI-STAGE SPEED REDUCER WITH RESILIENT SHAFT SUPPORTS

BACKGROUND OF THE INVENTION

The invention relates to a multi-stage speed-reducer drive, particularly adapted for slow-speed commercial vehicles or slow-speed mobile apparatus.

Drive systems of this type are known to comprise two internally operating planetary gearing stages and at least one speed-reducing stage connected to drive the first one of the aforementioned stages. The power transfer in such system runs from a pinion of the reduction stage to the greater or main gear of this stage, from the latter gear to the central gear of the intermediate stage, from the latter gear to the planet pinions or web gear of the intermediate stage, from there to the central gear of the output stage, and from the latter central gear to the planet pinions or web gear of the output stage, the latter gear being connected to the hub of a driving output wheel of the system. The pinion of the reduction stage may be coupled to the output shaft of a hydraulic motor, driving the entire system.

SUMMARY OF THE INVENTION

The object of the present invention is to provide a multi-stage speed-reducer drive incorporating the above planetary gearing stages, however, embodying simple means by which to enable a power equalization in such stages. Additionally, gearing parts are to be constructed to have low weight, particularly those parts which are to be supported resiliently.

According to the invention, such a drive is realized by yieldingly mounting the output or power take-off end of the central gear within the hollow shaft of the planet gear carrier of the output stage by means of resilient elements providing also transverse limiting of movement. These elements are positioned and arranged such that upon removal of the load from the drive gear of the system, the resiliency or restoring force of the elements effects centering of the shaft journals of the central gear against the weight thereof. Furthermore, and according to the invention, this central gear, at its driven side, is rigidly connected to the planet gear carrier of the intermediate stage while the latter gear, at its driven side, is mounted for pendulum movement. Also, the central gear of the intermediate stage is not rigidly mounted but connected for angular movement with the greater or main gear of the speed-reducing stage. The remainder of the drive elements are rigidly mounted within a housing enclosing the drive system.

In order to mount the planet gear carrier of the intermediate stage for pendulum movement, it is generally sufficient to utilize a roller bearing with limited bending capabilities. However, according to a further embodiment of the invention, capability of such movement is obtained and may be further combined with capability of transverse movement upon using resilient elements similar to those already used for centering the central gear of the output stage.

A particularly simple and space-saving as well as economic resilient mounting arrangement of this type is achieved by utilizing a plurality of O-rings made, preferably, of rubber and positioned in biased condition closely adjacent one another in a closed annular chamber surrounding the outer ring of a respective roller bearing, used for journalling proper in the respective instance.

BRIEF DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

FIG. 1 is a cross-sectional side view of the speedreducer drive according to one example of the preferred embodiment of this invention;

FIG. 2 is a side view, partially cut away to illustrate the resilient mounting arrangement of the central gear by means of the resilient mounting elements in FIG. 1.

DESCRIPTION OF THE PREFERRED EMBODIMENT

Figure 3:
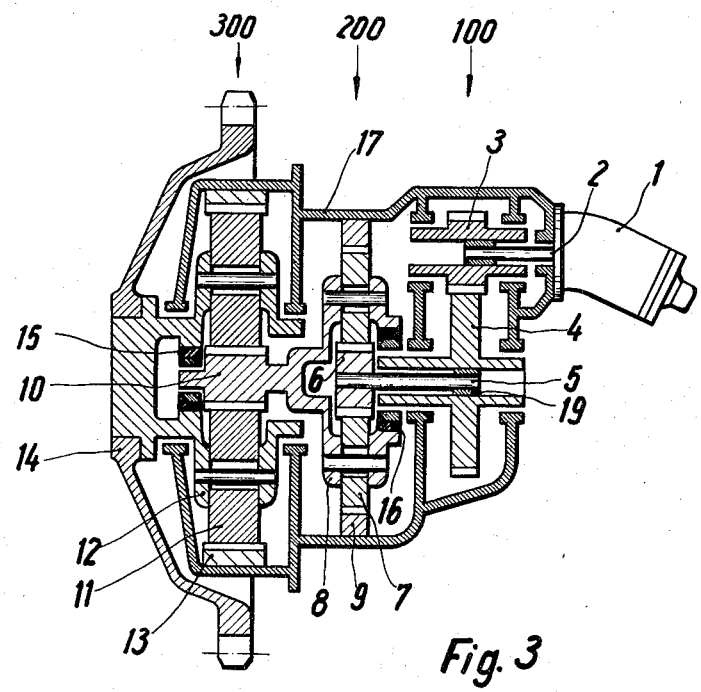
FIG. 3 is a similar view to FIG. 1, however, illustrating a further example in which the drive system is seen to incorporate the resiliently mounted central gear of FIG. 1, and a resilient mount for the web gear of the intermediate stage.

The speed-reducer drive illustrated in FIGS. 1 and 2 is seen to incorporate three drive stages 100, 200, and 300, with the second and third stages 200 and 300 connected for serial operation, the second and third stages being planetary gearing stages. Connected to these stages is the first stage 100, this stage being a simple reduction stage.

The three reducing stages 100, 200 and 300 are contained in a stationary housing 17 flanged at one end to a hydraulic motor 1. Motor 1 serves as power plant and prime mover or driving input whose rotary output (shaft 2) has to be speed reduced. The speed-reduced output is taken from a gear wheel having a hub 14 which is secured to the drive output of output stage 300.

Shaft 2 of motor 1 carries a pinion 3 suitably journalled on both sides in housing 17 and meshing a main gear 4, which is also journalled in bearings which are secured to housing 17. Large diameter gear 4 is coupled to a central gear 6 of the first planetary gear stage 200. Gear 6 meshes planetary gears 7 which run in a spur or ring gear 9 and are journalled in a carrier 8 for planetary gears 7. Carrier 8 is secured to central gear 10 of the third stage and second planetary gearing 300. Gear 10 meshes planetary gears 11 which run in spur or ring gear 13 and are journalled in a carrier 12 for planetary gears 11 and being secured to hub 14 for driving same.

The power transfer in this drive system runs from the hydraulic motor 1 via its shaft 2, to pinion 3 of reduction stage 100 and to the greater or main gear 4 of this stage; from the latter gear to the central gear 6 of intermediate stage 200 via the shaft 5; from gear 6 to the planet pinions 7 on carrier 8 of the intermediate stage, from there to the central gear 10 of the output stage and driving side of the system, and from this central gear to the planet pinions 11 on gear carrier 12 of the output stage, the latter gear being connected to the hub 14 of the drive wheel.

The output side or power take-off end of the central gear 10 of output stage 300 is yieldingly resiliently mounted within a hollow shaft 18 of planetary gear carrier 12 of the output stage 300, by means of resilient means 15 which are positioned and arranged such that upon removal of the load from the drive output of the system, the resiliency and restoring force of the resilient elements effects centering of the shaft journals of the central gear 10 overcoming readily the weight of the gear. This central gear 10 is not supported in bearings at its driven side, but is rigidly connected to planetary gear carrier 8 of intermediate stage 200, whose output side is not directly journalled accordingly. Carrier 8 is mounted for pendulum movement at its driven side by means of a bearing 20. The central gear 6 of the intermediate stage 200 is not supported in bearings at its driving input but connected to main gear 4 of the reduction stage 100 by means of a connection 19 permitting angular movement for shaft 5. The remainder of the drive elements are rigidly mounted within a housing 17 which encloses the drive system. This includes particularly the bearings of gears 3 and 4 and spur of ring gears 9 and 13.

FIG. 2, in cross-section, illustrates the resilient elements 15 for resiliently centering the central gear 10. As shown, rubber O-rings 22 are biased and confined in an annular chamber 21 defined by the hollow shaft 18 of the carrier 12, by the outer rings 23 of a roller bearing and by lateral portions of the carrier 12.

FIG. 3 shows a further embodiment of the speed-reducer drive according to the invention in which the carrier 8 of the intermediate stage 200, at its driven side, is transversely displaceably positioned and journalled by means of the resilient elements 16, analogous to the resilient bearing elements 15 for the shaft end of gear 10. Otherwise FIG. 3 is similar to FIG. 2.

With such a construction of the speed-reducer drive, the advantage is obtained that the two planetary gearing stages have load relief in which those sections of the gearing stages which are amenable to transverse motion, are interconnected directly. Furthermore, such a construction obviates the use of at least one resilient bearing, this in view of the fact that with separate and individual resilient mounting of the planetary gearing stages, each stage would require at least one resilient bearing and one bearing capable of pendulum movement, or two resiliently yielding bearings. Moreover, in specific embodiments, a connection would be needed in addition to provide for angular displacement between the central gear of the output stage and the web gear of the intermediate stage.

The speed-reducer drive, thus constructed, not only offers an economical structure, but equalizes load distribution among the two planetary gearing stages. The resilient elements support the weight of the resiliently mounted element in a way that these elements remain centered to a substantial degree and thereby ensure accurate intermeshing of the geared parts and eliminate twisting and, thereby, breakage of corner-and edge portions during the strong alternating torque to which the gears are subjected.

Sudden changes in load, caused primarily by frequent starting after stopping, caused further by a reverse operation and high load peaks, and by the use of electric drive motors, are taken up by the speed-reducer drive of the invention as a result of the uniform and even distribution of the bearing pressure over the entire width of the teeth of the gears.

The resilient elements are biased to such a degree so that they are sufficiently hard to prevent disengagement of the intermeshing gears but, also, are sufficiently pliant to permit transverse motion of the resiliently mounted elements to enable load equalization of the system.

The few and simple resilient elements and bearings enable a drive design which requires only a small mounting space and, moreover, visualizes a compact type of construction.

The invention is not limited to the embodiments described above but all changes and modifications thereof not constituting departures from the spirit and scope of the invention are intended to be included.

I claim:

1. Multi-stage speed reducing gear, including a first speed reducing stage having input pinion and large diameter output gear, the speed reducing gear further including first and second, serially operating planetary gears each having a central gear and planet gears journalled in a carrier, the carrier of the second planetary gear having a hollow shaft, the central gear of the second planetary gears having a shaft end journalled in the hollow shaft, the improvement comprising:

resilient means for yieldingly journalling the shaft end in the hollow shaft for limited transverse displacement therein, and centering the shaft end in the hollow shaft upon no-load conditions;

the carrier of the first planetary gear being rigidly secured to and supported by the central gear of the second planetary gear, on one side of the central gear of the first planetary gear, for driving the latter central gear as the latter central gear is being resiliently supported by said resilient means in said hollow shaft;

the carrier of the first planetary gear as secured to the central gear of the second planetary gear, being supported by the latter central gear so as to permit pendulum movement of the portion of the carrier of the first planetary gear as extending on the other side of the central gear of the first planetary gear;

shaft means carrying the central gear of the first planetary gear for connecting the central gear of the first planetary gear to the large diameter output gear permitting limited angular displacement of the end of the shaft means relative to the large gear, the central gear of the first planetary gear meshing with the planet gears thereof and being journalled therewith and being free from additional bearing support; and a housing for the speed-reducing gear, bearings for the pinion and for the large diameter output gear of the first reducing stage, and spur gears of the first and second planetary gears being secured to said housing.

2. A reducing gear as in claim 1, and including a roller bearing for journalling the said shaft end in said hollow shaft but leaving an annular gap, the resilient means including a plurality of O-rings in said annular gap.

3. A reducing gear according to claim 2, wherein said O-rings are made of rubber.

4. A reducing gear as in claim 2, and including means for axially biasing the O-rings.

5. A reducing gear according to claim 1, wherein second resilient means are provided on the said other side of the central gear of the first planetary gearing, said carrier of said first planetary gearing stage being resiliently mounted for pendulum movement on its drive side by said second resilient means.

6. A drive according to claim 5, wherein said first and second resilient means each comprise a plurality of closely adjacent rubber O-rings.

* * * * *